United States Patent
Bacchi et al.

[11] Patent Number: 6,098,484
[45] Date of Patent: Aug. 8, 2000

[54] HIGH TORQUE, LOW HYSTERESIS, MULTIPLE LINK ROBOT ARM MECHANISM

[75] Inventors: Paul Bacchi, Novato; Paul S. Filipski, Greenbrae, both of Calif.

[73] Assignee: Kensington Laboratories, Inc., Richmond, Calif.

[21] Appl. No.: 09/204,754

[22] Filed: Dec. 2, 1998

Related U.S. Application Data

[63] Continuation-in-part of application No. 09/098,167, Jun. 16, 1998, which is a continuation-in-part of application No. 08/500,489, Jul. 10, 1995, Pat. No. 5,765,444.

[51] Int. Cl.$^7$ .............................. G05G 11/00; B25J 17/00
[52] U.S. Cl. ................................. 74/490.03; 414/744.5; 901/40
[58] Field of Search ............................. 414/744.5; 901/8, 901/15, 40; 74/490.03, 490.01, 490.05

[56] References Cited

U.S. PATENT DOCUMENTS

| | | | |
|---|---|---|---|
| 4,065,001 | 12/1977 | Ohnaka | 214/1 BV |
| 4,299,533 | 11/1981 | Ohnaka | 414/752 |
| 4,787,813 | 11/1988 | Stevens et al. | 414/744.5 |
| 4,813,846 | 3/1989 | Helms | 414/744.1 |
| 4,897,015 | 1/1990 | Abbe et al. | 414/744.8 |
| 5,007,784 | 4/1991 | Genov et al. | 414/225 |
| 5,064,340 | 11/1991 | Genov et al. | 414/744.5 |
| 5,102,280 | 4/1992 | Podjue et al. | 414/225 |
| 5,151,008 | 9/1992 | Ishida et al. | 414/744.5 |
| 5,314,294 | 5/1994 | Taniguchi et al. | 414/744.6 |
| 5,513,946 | 5/1996 | Sawada et al. | 414/744.5 |
| 5,584,647 | 12/1996 | Uehara et al. | 414/744.5 |

OTHER PUBLICATIONS

Data Sheet for Kensington Laboratories WH–3 Wafer Handler Robot Mechanism (1986).
Drawing figure showing motor arrangement implemented in WH–3 mechanism.

*Primary Examiner*—David M. Fenstermacher
*Attorney, Agent, or Firm*—Stoel Rives LLP

[57] ABSTRACT

A robot arm mechanism (10) maximizes available torque and control accuracy by arranging first and second high torque motors (50, 52) in a concentric relationship about a shoulder axis (16). The first motor is coupled through a 1:1 ratio endless belt to rotate a forearm (22) about an elbow axis (32). The second motor is 1:1 directly coupled to rotate an upper arm (14) about the shoulder axis. A motor controller (100) controls the first and second motors in at least two operational states. The first operational state equally contrarotates the first and second motors to linearly extend or retract a hand (30), and the second operational state equally rotates the first and second motors to angularly displace the hand about the shoulder axis. The robot arm mechanism has a 1:1:1:2 overall drive ratio and an indexing vane (130) for eliminating positional ambiguity problems stemming from a continuous rotation capability of the robot arm mechanism. The indexing vane has four alternating short (132) and long blades (136) evenly spaced around a circle. The indexing vane is detented to rotate into four quadrant rest positions. An indexing pin (144) contacts one of the four blades for each 360 degree rotation of the first motor relative to the second motor such that the long blades break a light beam in an optical switch assembly (148) for each 720 degrees of relative rotation. The indexing vane stores and updates a rotational state of the robot arm mechanism even if the power is off and the robot arm mechanism is manually repositioned or otherwise disturbed.

20 Claims, 11 Drawing Sheets

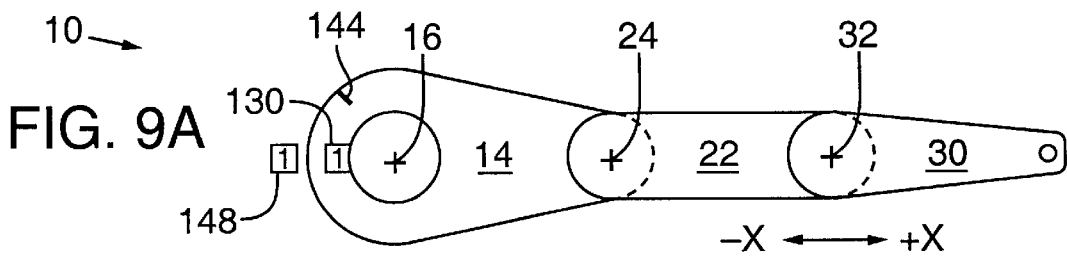
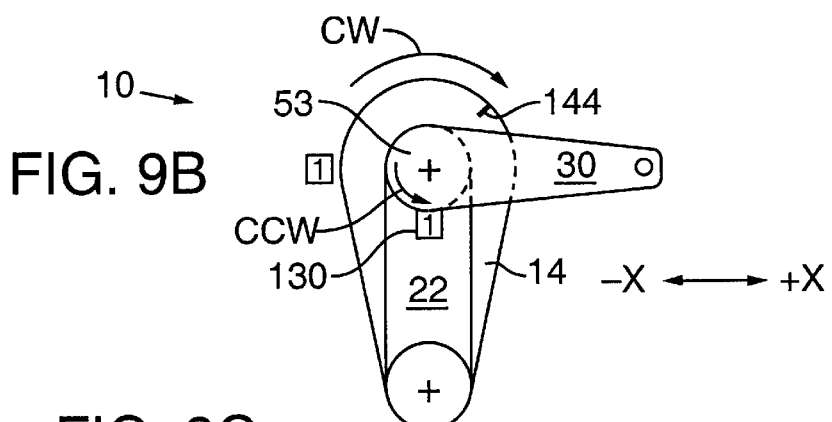
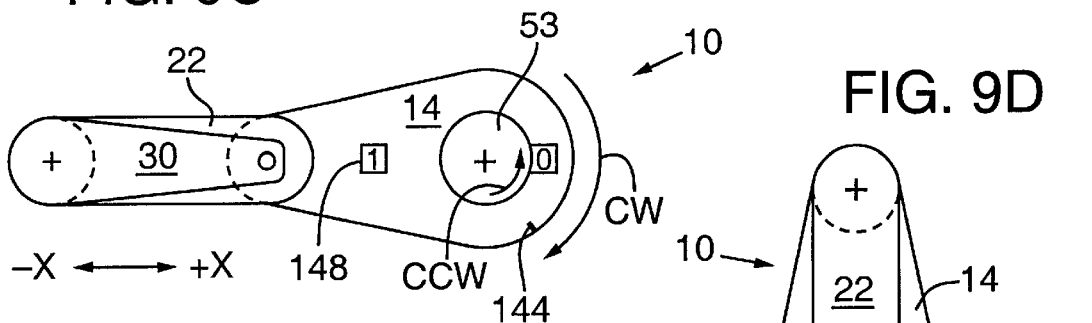
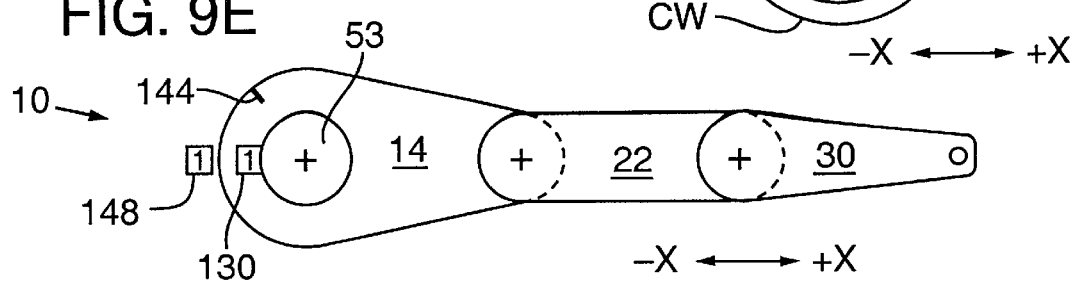

HIGH TORQUE, LOW HYSTERESIS, MULTIPLE LINK ROBOT ARM MECHANISM

RELATED APPLICATIONS

This application is a continuation-in-part of U.S. patent application Ser. No. 09/098,167, filed Jun. 16, 1998 for SINGLE AND DUAL END EFFECTOR, MULTIPLE LINK ROBOT ARM SYSTEMS HAVING TRIAXIAL DRIVE MOTORS, which is a continuation-in-part of U.S. patent application Ser. No. 08/500,489, filed Jul. 10, 1995, for DUAL END EFFECTOR, MULTIPLE LINK ROBOT ARM SYSTEM WITH CORNER REACHAROUND AND EXTENDED REACH CAPABILITIES, now U.S. Pat. No. 5,765,444.

TECHNICAL FIELD

This invention relates to robot arm mechanisms and, in particular, to a high torque, low hysteresis, multiple link robot arm mechanism.

BACKGROUND OF THE INVENTION

Currently available robot arm mechanisms include pivotally joined multiple links that are driven by a first motor and are mechanically coupled to effect straight line movement of an end effector or hand and are equipped with a second motor to angularly displace the hand about a central axis. Certain robot arm mechanisms are equipped with telescoping mechanisms that move the hand also in a direction perpendicular to the plane of straight line movement and angular displacement of the hand. The hand is typically provided with a vacuum outlet or some other gripping mechanism that secures a specimen, such as a semiconductor wafer, computer hard disk, or compact disk, to the hand as it transports the specimen between processing stations.

U.S. Pat. No. 4,897,015 of Abbe et al. describes a rotary-to-linear motion robot arm that uses a first motor to control a multiple link robot arm to produce straight line radial motion from motor-driven rotary motion. An additional motor may be coupled to the robot arm for operation independent of that of the first motor to angularly move the multiple link robot arm without radial motion. Because they independently produce radial motion and angular motion, the first and second motors produce useful robot arm movement when either one of them is operating.

The robot arm of the Abbe et al. patent extends and retracts an end effector (or hand) along a straight line path by means of a mechanism that pivotally couples in a fixed relationship a first arm (or forearm) and a second (or upper) arm so that they move in predetermined directions in response to rotation of the upper arm. To achieve angular displacement of the hand, a third drive motor rotates the entire robot arm structure. The Abbe et al. patent describes no capability of the robot arm to reach around corners or travel along any path other than a straight line or a circular segment defined by a fixed radius.

U.S. Pat. No. 5,007,784 of Genov et al. describes a robot arm with an end effector structure that has two oppositely extending hands, each of which is capable of picking up and transporting a specimen. The end effector structure has a central portion that is centrally pivotally mounted about the distal end of a second link or forearm. The extent of pivotal movement about all pivot axes is purposefully limited to prevent damage to vacuum pressure flexible conduits resulting from kinking or twisting caused by over-rotation in a single direction.

The coupling mechanism of a first link or upper arm, the forearm, and the end effector structure of the robot arm of the Genov et al. patent is more complex than that of the robot arm of the Abbe et al. patent. Nevertheless, the robot arm structures of the Abbe et al. and Genov et al. patents operate similarly in that each of the end effector structures picks up and transports specimens by using one motor to extend and retract a hand and another, different motor to rotate the entire robot arm structure to allow the hand to extend and retract at different ones of a restricted number of angular positions.

More complex movement capability is described in U.S. Pat. No. 5,765,444 for DUAL END EFFECTOR, MULTIPLE LINK ROBOT ARM SYSTEM WITH CORNER REACHAROUND AND EXTENDED REACH CAPABILITIES, which is assigned to the assignee of this application and is incorporated herein by reference. A multiple link robot arm mechanism includes two coaxially arranged motors mounted that are capable of synchronized operation that moves a robot arm hand along a curvilinear path as the extension of the hand changes. The first motor rotates a forearm about an elbow axis that extends through distal and proximal ends of the upper arm and forearm, respectively, and the second motor rotates an upper arm about a shoulder axis that extends through a proximal end of the upper arm. A mechanical linkage couples the upper arm and the forearm. The mechanical linkage forms an active drive link and a passive drive link. The active drive link operatively connects the first motor and the forearm to cause the forearm to rotate about the elbow axis in response to the first motor. The passive drive link operatively connects the forearm and the hand to cause the hand to rotate about a wrist axis in response to rotation of the forearm about the elbow axis. The wrist axis extends through distal and proximal ends of the forearm and hand, respectively.

Whenever the first and second motors move equal angular distances, the angular displacement of the upper arm about the shoulder axis and the angular displacement of the forearm about the elbow axis equally offset and thereby result in only a net angular displacement of the hand about the shoulder axis. Thus, under these conditions, there is no linear displacement of the hand and no rotation of the hand about the wrist axis. Whenever the first and second motors move different angular distances, the angular displacement of the upper arm about the shoulder axis and the angular displacement of the forearm about the elbow axis only partly offset and thereby result in angular displacements of the hand about the shoulder and wrist axes and a linear displacement of the hand. Accordingly, coordination of the position control of the first and second motors enables the robot arm mechanism to describe a compound curvilinear path of travel for the hand.

Such robot arm mechanisms are commonly employed to transport semiconductor wafers among storage cassettes, prealigners, and processing stations. Prior multiple link robot arm mechanisms employed a 2:1:1:2 drive ratio and were capable of moving 200 millimeter diameter wafers. However, semiconductor wafers are increasing in size and weight, making them more difficult to move rapidly and accurately over the extended distances required for 300 millimeter diameter wafers. Accordingly, additional positioning torque and extended reach capabilities were developed by the assignee of this application and described in U.S. patent application Ser. No. 09/098,167, filed Jun. 16, 1998 for SINGLE AND DUAL END EFFECTOR, MULTIPLE LINK ROBOT ARM SYSTEMS HAVING TRI- AXIAL DRIVE MOTORS, which is assigned to the assignee of this application and is incorporated herein by reference. The robot arm described therein has a 1:1:1:2 drive ratio, which is advantageous because it has twice the angular drive resolution and transmits twice the motor torque to the robot arm mechanism, thereby allowing longer links for an extended reach capability.

However, the 1:1:1:2 drive ratio has a disadvantage that has discouraged its use. Each rotation of the first motor relative to the second motor causes two extension and retraction cycles of the hand. Therefore, when the robot arm system is first powered up, it is impossible to determine whether a particular relative directional rotation of the first and second motors will extend or retract the hand, and in which of two opposite directions the hand will point.

What is needed, therefore, is a robot arm system that has straight line motion, extended reach, and corner reacharound capabilities for rapidly and accurately transporting large specimens to virtually any location in an available work space.

SUMMARY OF THE INVENTION

An object of the invention is, therefore, to provide a multiple link robot arm system that has straight line motion, extended reach, corner reacharound, and continuous bidirectional rotation capabilities for transporting specimens to virtually any location in an available work space.

Another object of the invention is to provide such a system that increases specimen positioning speed, distance, and accuracy.

A further object of the invention is to provide such a system for transporting 300 millimeter diameter semiconductor wafers.

Yet another object of this invention is to provide such a system with a 1:1:1:2 overall drive ratio, but without the pointing direction ambiguity problem of prior 1:1:1:2 ratio robot arm systems.

A multiple link robot arm mechanism of this invention has a 1:1:1:2 overall drive ratio and a rotational state sensor for eliminating the positional ambiguity problem. The robot arm mechanism includes an end effector having a single-ended hand, or alternatively, two oppositely extending hands. The multiple link robot arm maximizes available torque by arranging first and second high torque motors in a concentric relationship about a shoulder axis to permit rapid movement of the robot arm hand along a curvilinear path as the extension of the hand changes. The first motor is coupled through a 1:1 ratio endless belt to rotate a forearm about an elbow axis that extends through distal and proximal ends of an upper arm and forearm, respectively. The second motor is 1:1 directly coupled to rotate the upper arm about the shoulder axis that extends through a proximal end of the upper arm. A mechanical linkage coupling the upper arm and the forearm forms an active 1:1 ratio drive link and a passive 1:2 ratio drive link. The active drive link operatively connects the first motor and the forearm to cause the forearm to rotate about the elbow axis in response to the first motor. The passive drive link operatively connects the forearm and the hand to cause the hand to rotate about a wrist axis in response to rotation of the forearm about the elbow axis. The wrist axis extends through distal and proximal ends of the forearm and hand, respectively.

A motor controller controls the first and second motors in at least two preferred operational states to enable the robot arm mechanism to perform two principal motion sequences. The first operational state equally contrarotates the first and second motors so that the mechanical linkage causes linear displacement (i.e., extension or retraction) of the hand. The second operational state equally rotates the first and second motors so that the mechanical linkage causes angular displacement of the hand about the shoulder axis. A variation of the second operational state can provide an indefinite number of travel paths for the hand, depending on coordination of the rotational control of the first and second motors.

Whenever the first and second motors move equal angular distances, the angular displacement of the upper arm about the shoulder axis and the angular displacement of the forearm about the elbow axis equally offset and thereby result in only a net angular displacement of the hand about the shoulder axis. Thus, under these conditions, there is no linear displacement of the hand and no rotation of the hand about the wrist axis.

Whenever the first and second motors move different angular distances, the angular displacement of the upper arm about the shoulder axis and the angular displacement of the forearm about the elbow axis only partly offset and thereby result in angular displacements of the hand about the shoulder and wrist axes and consequently a linear displacement of the hand. Coordination of the position control of the first and second motors enables the robot arm mechanism to describe a compound curvilinear path of travel for the hand.

The robot arm includes an indexing vane that resolves the above-described directional control ambiguity. The indexing vane is a Maltese cross-shaped rotational state storage device having four alternating short and long blades evenly spaced around a circle. The indexing vane is detented to rotate into four quadrant rest positions. An indexing pin contacts one of the four blades for each 360 degree rotation of the first motor relative to the second motor such that the long blades break a light beam in an optical switch assembly for each 720 degrees of relative rotation. The indexing vane stores and updates a rotational state of the robot arm mechanism even if the power is off and the robot arm mechanism is manually repositioned or otherwise disturbed. The indexing vane acts as a modulo two up/down counter that unambiguously indicates in which direction the hand is pointing.

The robot arm mechanism is further equipped with rotary fluid multiple-passageway spools that deliver fluid pressure to the hand or hands through each rotary joint of the robot arm mechanism, thereby permitting continuous rotation of the robot arm links about the shoulder, elbow, and wrist axes.

Additional objects and advantages of this invention will be apparent from the following detailed description of preferred embodiments thereof, which proceeds with reference to the accompanying drawings.

BRIEF DESCRIPTION OF THE DRAWINGS

FIGS. 9A to 9E are five simplified plan views showing a robot arm retraction and extension sequence and its effect on the indexing vane of this invention.

DETAILED DESCRIPTION OF PREFERRED EMBODIMENTS

Figure 1:
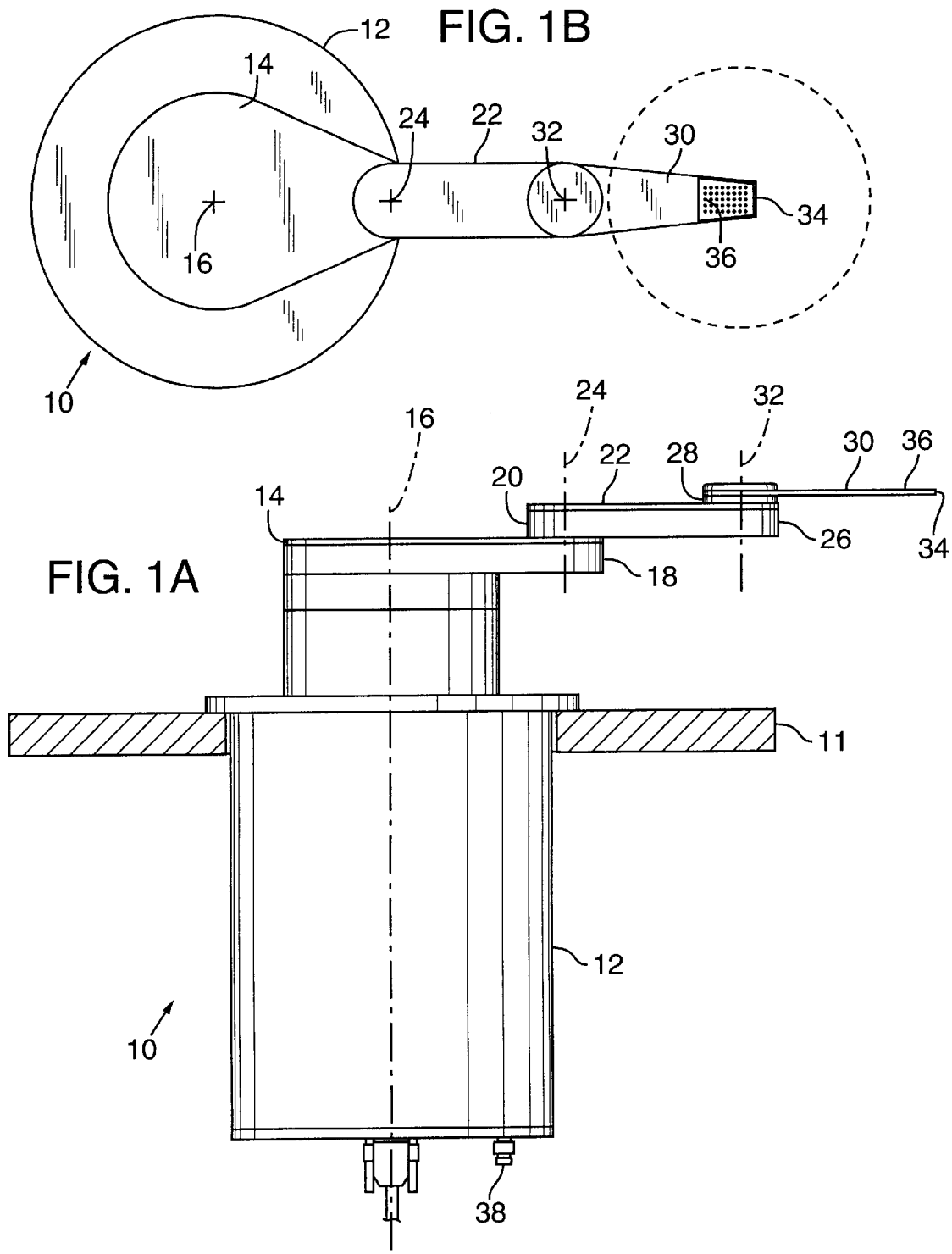
FIGS. 1A and 1B are respective side elevation and plan views of a multiple link robot arm system of this invention.

FIGS. 1A and 1B are respective side elevation and plan views of a three link robot arm system 10 mounted on and through an aperture in the top surface of a support table 11. Three-link robot arm mechanism 10 is rotatably mounted to the top surface of a base housing 12 for rotation of an upper arm 14 about a central or shoulder axis 16.

Upper arm 14 has a distal end 18 to which a proximal end 20 of a forearm 22 is mounted for rotation about an elbow axis 24, and forearm 22 has a distal end 26 to which a proximal end 28 of a hand 30 is mounted for rotation about a wrist axis 32. Hand 30 is equipped at a distal end 34 with a fluid pressure outlet 36 that preferably applies vacuum pressure supplied to robot arm mechanism 10 at an inlet 38 to securely hold a semiconductor wafer, compact disk, or other suitable specimen (shown in phantom) in place on hand 30. As will be described in detail later, each of upper arm 14, forearm 22, and hand 30 is capable of continuous rotation about its respective shoulder axis 16, elbow axis 24, and wrist axis 32.

Figure 2:
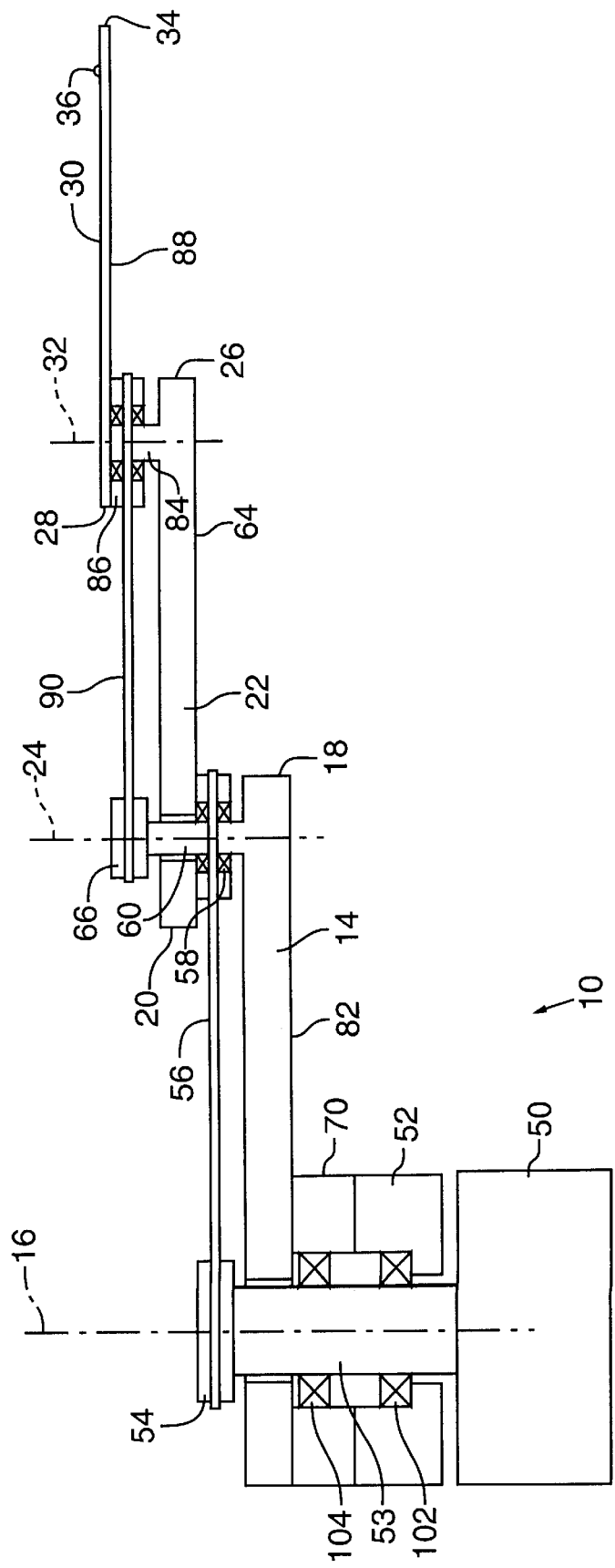
FIG. 2 is a side elevation view in conceptual stick diagram form showing the motors, link components, and associated mechanical linkages of the robot arm system of FIGS. 1A and 1B.

FIG. 2 shows the link components and associated mechanical linkage of robot arm mechanism 10, which is positioned through endless belt drive systems coupled to first and second concentric motors 50 and 52 that operate in response to commands provided by a motor controller 100, which is described with reference to FIGS. 3 and 7. First motor 50 is coupled to rotate forearm 22 about elbow axis 24, and second motor 52 is coupled to rotate upper arm 14 about shoulder axis 16.

More specifically, first motor 50 rotates a forearm spindle 53 that extends through an aperture in upper arm 14 and terminates in a drive pulley 54. Drive pulley 54 is coupled in a 1:1 ratio by an endless belt 56 to a forearm drive pulley 58. A post 60 extends upwardly along elbow axis 24 at distal end 18 of upper arm 14 and through the center of forearm drive pulley 58 that is mounted to a bottom surface 64 of forearm 22 at its proximal end 20. Post 60 also extends through an aperture in forearm 22 and terminates in a hand drive pulley 66. Endless belt 56 connects in a 1:1 ratio drive pulley 54 and forearm drive pulley 58 to rotate forearm 22 about elbow axis 24 in response to rotation of first motor 50.

Second motor 52 is directly attached by a coupling 70 to a bottom surface 82 of upper arm 14 to rotate upper arm 14 about shoulder axis 16. Coordinated operation of first and second motors 50 and 52 in conjunction with the mechanical linkage described below causes hand 30 to rotate about shoulder axis 16. A post 84 extends upwardly through bearings encircling the center of a hand pulley 86 that is mounted to a bottom surface 88 of hand 30. An endless belt 90 connects in a 1:2 ratio hand drive pulley 66 to hand pulley 86 to rotate hand 30 about shoulder axis 16 in response to the coordinated rotational motions of first and second motors 50 and 52.

The mechanical linkage coupling upper arm 14 and forearm 22 forms an active drive link and a passive drive link. The active drive link includes endless belt 56 connecting drive pulley 54 and the forearm drive pulley 58 and causes forearm 22 to rotate in a 1:1 ratio relative to rotation of first motor 50. The passive drive link includes endless belt 90 connecting hand drive pulley 66 and hand pulley 86 and causes hand 30 to rotate about wrist axis 32 in a 1:2 ratio relative to rotation of forearm 22 about elbow axis 24. Rotation of hand 30 can also be caused by a complex interaction among the active and passive drive links and the rotation of upper arm 14 in response to rotation of second motor 52.

Figure 3:
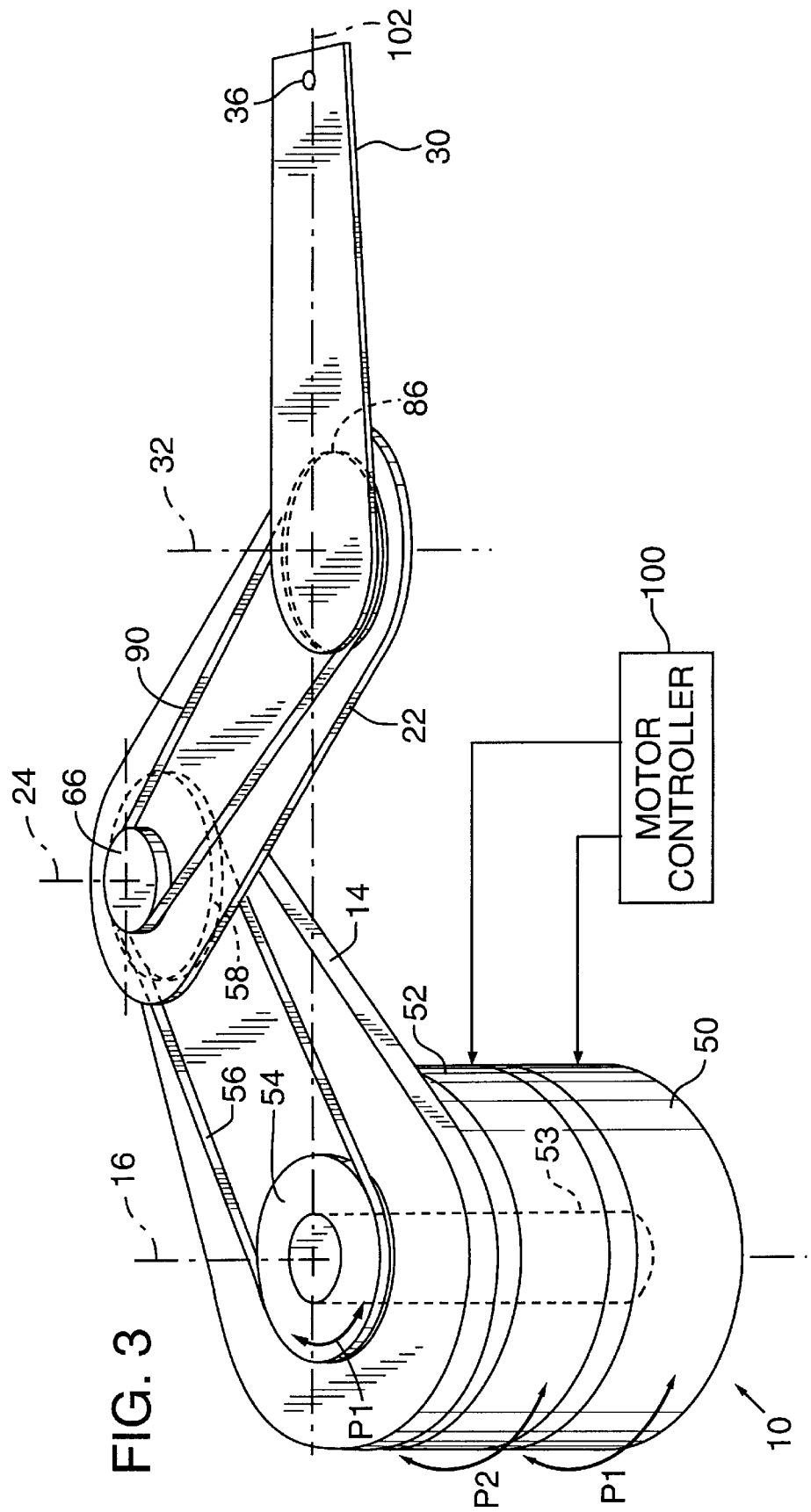
FIG. 3 is an isometric view in conceptual stick diagram form showing the rotational and linear motions imparted by two motors arranged in a coaxial concentric relationship and associated drive links of the robot arm system of FIGS. 1A and 1B.

Referring also to FIG. 3, motor controller 100 controls motors 50 and 52 in at least two preferred operational states to enable robot arm mechanism 10 to perform first and second motion sequences relative to shoulder axis 16. The first motion sequence changes the extension or radial position of hand 30, and the second motion sequence changes the angular position of hand 30 relative to shoulder axis 16.

In the first operational state, motor controller 100 causes first and second motors 50 and 52 to equally contrarotate respective drive pulley 54 and upper arm 14. The rotation of upper arm 14 relative to the contrarotation of drive pulley 54 causes rotation of forearm 22 about elbow axis 24 and contrarotation of hand 30 about wrist axis 32. Because the ratio of the diameters of drive pulley 54 and forearm drive pulley 58 is 1:1 and the ratio of the diameters of hand drive pulley 66 and hand pulley 86 is 1:2, the rotation of upper arm 14 in directions specified by $P_2$ and the contrarotation of forearm 22 in directions specified by $P_1$ causes fluid pressure outlet 36 of hand 30 to move along a straight line path 102 radial to shoulder axis 16.

As forearm 22 and upper arm 15 contrarotate in the directions specified respectively by $P_1$ and $P_2$, fluid pressure outlet 36 of hand 30 alternately extends and retracts in radial distance from shoulder axis 16 along straight line path 102. When robot arm mechanism 10 is fully extended as shown in FIG. 1B, axes 16, 24, and 32 are collinear and fluid pressure outlet 36 is at a maximum radial distance from shoulder axis 16.

Prior 2:1:1:2 overall ratio robot arms achieved linear hand motion by rotating second motor 52 and "locking" first motor 50. Unfortunately this introduced into first motor 50 a control disturbance resulting from dynamic coupling induced by the rotation of second motor 52. In the 1:1:1:2 overall ratio robot arm of this invention, contrarotation of first and second motors 50 and 52 improves the control of the system because both motors are actively driven and have similar dynamic performance, thereby resulting in improved trajectory control. Contrarotation is further beneficial because it reduces endless belt stretch-related rotational hysteresis.

In the second operational state, motor controller 100 causes first motor 50 to rotate drive pulley 54 and, by 1:1 ratio coupling through endless belt 56, forearm drive pulley 58 in the directions specified by $P_1$. Motor controller 100 also causes second motor 52 to rotate by 1:1 ratio through coupling 70 upper arm 14 in the directions specified by $P_2$. In the special case in which motors 50 and 52 are synchronized to rotate in the same direction by the same amount of displacement, hand 30 is only angularly displaced about shoulder axis 16. This is so because the rotation of forearm 22 about elbow axis 24 caused by the rotation of first motor 50 and the rotation of hand 30 about wrist axis 32 caused by rotation of second motor 52 and the operation of the passive drive link offset each other to produce no net rotation about elbow axis 24 and wrist axis 32. Thus, hand 30 is fixed radially at a point along path 102 and describes a circular path as upper arm 14 rotates about shoulder axis 16. By application of kinematic constraints to achieve a desired travel path for hand 30, motor controller 100 can operate first and second motors 50 and 52 to move robot arm mechanism 10 along nonradial straight line paths.

In an alternative embodiment (not shown) employing an end effector having oppositely extending hands, a first hand retracts while a second hand simultaneously extends, and vice versa. In the special cases when the first and second hands are fully retracted so that wrist axis 32 is collinear with shoulder axis 16, a 180-degree rotation of robot arm mechanism 10 in the second operational state effects an end-for-end swap of the first and second hands, which is useful in many specimen handling applications.

Figure 4:
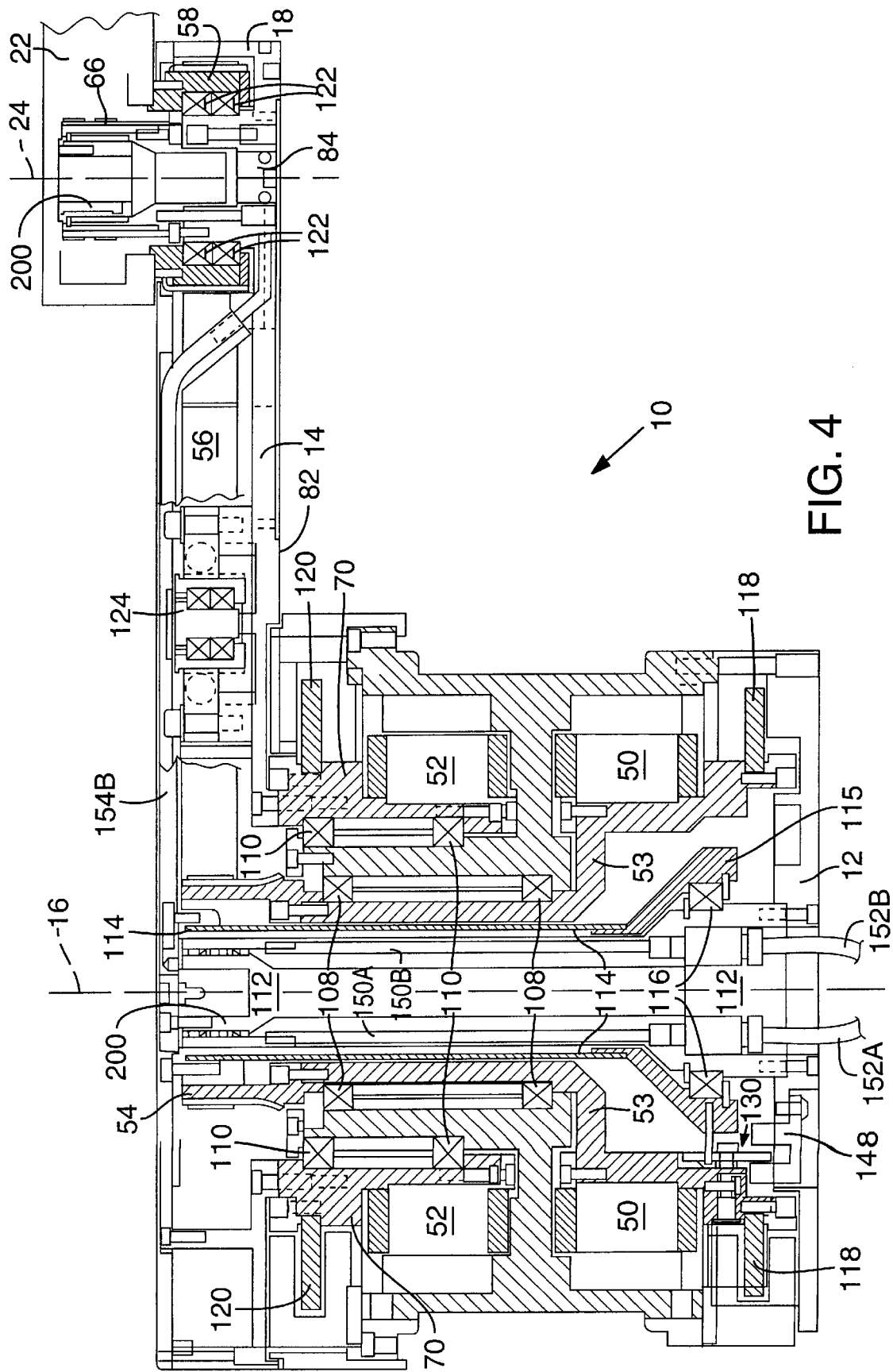
FIG. 4 is a fragmentary elevation view of the base housing and upper arm of the robot arm system of FIGS. 1A and 1B sectionally cut away to reveal the interior components, two drive motors in a coaxial concentric relationship, mechanical linkages, fluid pressure conduits, and an indexing vane of this invention.

FIG. 4 shows details of the interior components, coaxial motor arrangement, mechanical linkages, and fluid pressure conduits of robot arm mechanism 10. Base housing 12 contains first motor 50 and second motor 52 arranged in coaxial concentric relation such that forearm spindle 53 and coupling 70 independently rotate about shoulder axis 16. Forearm spindle 53 is journaled for rotation on bearings 108 and coupling 70 is journaled for rotation on bearings 110. A rigid, nonrotating spine 112 protrudes upwardly along shoulder axis 16 from the bottom of base housing 12 to provide bearing support for fluid pressure conduits and a torque tube 114 that protrudes downwardly from upper arm 14 and terminates in a skirt 115. Torque tube 114 rotates with upper arm 14, and with skirt 115 is journaled for rotation on bearings 116 about shoulder axis 16. Torque tube 114 rotates within the narrow gap formed between spine 112 and forearm spindle 53.

The coaxial arrangement of this invention allows motors 50 and 52 to have a large diameter that provides high rotational torque to drive pulley 54 and upper arm 14 while placing their significant motor mass centrally toward shoulder axis 16. Accordingly, the moment of inertia of robot arm system 10 is reduced and its rotational accelerations are increased.

The angular positions of motors 50 and 52 are tracked by respective glass scale encoders 118 and 120, each of which includes an annular diffraction grating scale and an associated light source/detector subassemblies. Such glass scale encoders are known to skilled persons.

Figure 5:
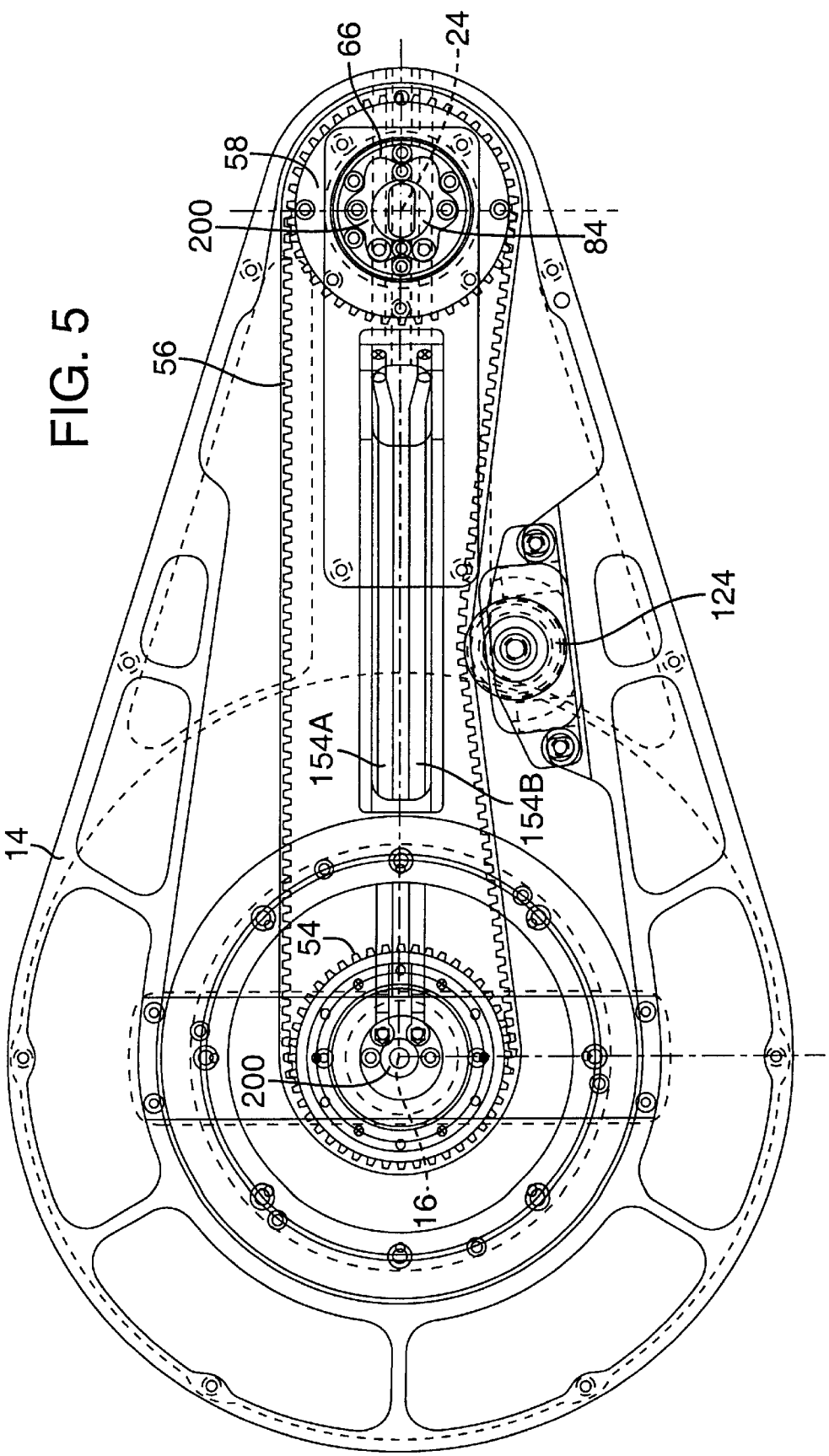
FIG. 5 is a fragmentary plan view of the upper arm of the robot arm system of FIGS. 1A and 1B sectionally cut away to reveal the interior components, mechanical linkages, and fluid pressure conduits therein.

Referring also to FIG. 5, first motor 50 rotates forearm spindle 53 and drive pulley 54 that is coupled by endless belt 56 to forearm drive pulley 58, which is journaled on bearings 122 for rotation about post 84. Forearm drive pulley 58 rotates forearm 22 about elbow axis 24 in response to rotation of first motor 50. Second motor 52 rotates upper arm 14 about shoulder axis 16. Hand drive pulley 66 is rigidly attached to post 84, which is rigidly attached to upper arm 14.

In the preferred embodiment, shoulder axis 16 and elbow axis 24 are spaced apart by 133.4 millimeters (5.25 inches), elbow axis 24 and wrist axis 32 are spaced apart by 133.4 millimeters (5.25 inches), and wrist axis 32 and fluid pressure outlet 36 are spaced apart by 190.5 millimeters (7.5 inches). These spacings are suitable for placing, retrieving, and positioning 300-millimeter (12-inch) diameter specimens, such as semiconductor wafers, with robot arm mechanism 10. Of course, many other spacings may be employed to satisfy other applications.

Also in the preferred embodiment, endless belts 56 and 90 are cogged belts having teeth spaced apart by 3 millimeters (0.12 inch). Accordingly, all of the pulleys that the belts mesh with are cogged pulleys having mating teeth spaced apart by 3 millimeters. Endless belts 56 has slack removed and is suitably tensioned by a spring biased idler wheel 124. Likewise, endless belt 90 is tensioned by another spring biased idler wheel (not shown).

Further in the preferred embodiment, drive pulley 54 and forearm drive pulley 58 form a 1:1 drive ratio. Likewise, hand drive pulley and hand pulley 86 form a 1:2 drive ratio. Accordingly, robot arm mechanism 10 has a preferred 1:1:1:2 overall drive ratio, whereas prior robot arm mechanisms employed a 2:1:1:2 drive ratio.

An advantage of the 1:1:1:2 drive ratio is that it transmits twice the torque of first motor 50 to robot arm mechanism 10 than does the 2:1:1:2 drive ratio. This allows implementation of longer links for an extended reach capability without unduly sacrificing their rotational accelerations.

Another advantage of the 1:1:1:2 drive ratio is that the contrarotation of second motor 52 provides additional torque for imparting motion to robot arm mechanism 10. Moreover, because the prior 2:1:1:2 drive ratio required rotation of only second motor 52 to achieve linear displacement of hand 30, first motor 50 was undriven and had a tendency to respond to a control disturbance resulting from dynamic coupling induced by the rotation of second motor 52. This problem is eliminated by the 1:1:1:2 drive ratio because first and second motors 50 and 52 are both actively driven and controlled.

Yet another advantage of the 1:1:1:2 drive ratio is that in the first operational state of motor controller 100, the contrarotation of first and second motors 50 and 52 places rotationally-opposing forces on the endless belts, thereby canceling out any belt stretch-related rotational hysteresis and rendering more accurate the movements of hand 30.

A further advantage of the 1:1:1:2 drive ratio is that glass scale encoder 118 has twice the effective resolution for controlling movements of robot arm mechanism 10 in response to first motor 50.

However, as mentioned in the background of this invention, the 1:1:1:2 drive ratio has a disadvantage that has discouraged its use. Each rotation of first motor 50 relative to second motor 52 causes two extension and retraction cycles of hand 30. Moreover, the pointing direction of hand 30 reverses with each cycle. Therefore, when robot arm mechanism 10 is first powered up, it is impossible to determine from reading glass scale encoders 118 and 120 whether a particular relative directional rotation of first and second motors 50 and 52 will extend or retract hand 30 in which of two opposite directions. Indeed, in continuously rotatable robot arm applications, it has been impossible for any single revolution encoder to detect this condition without employing the undue expense and complexity of external motion sensors.

Figure 6A:
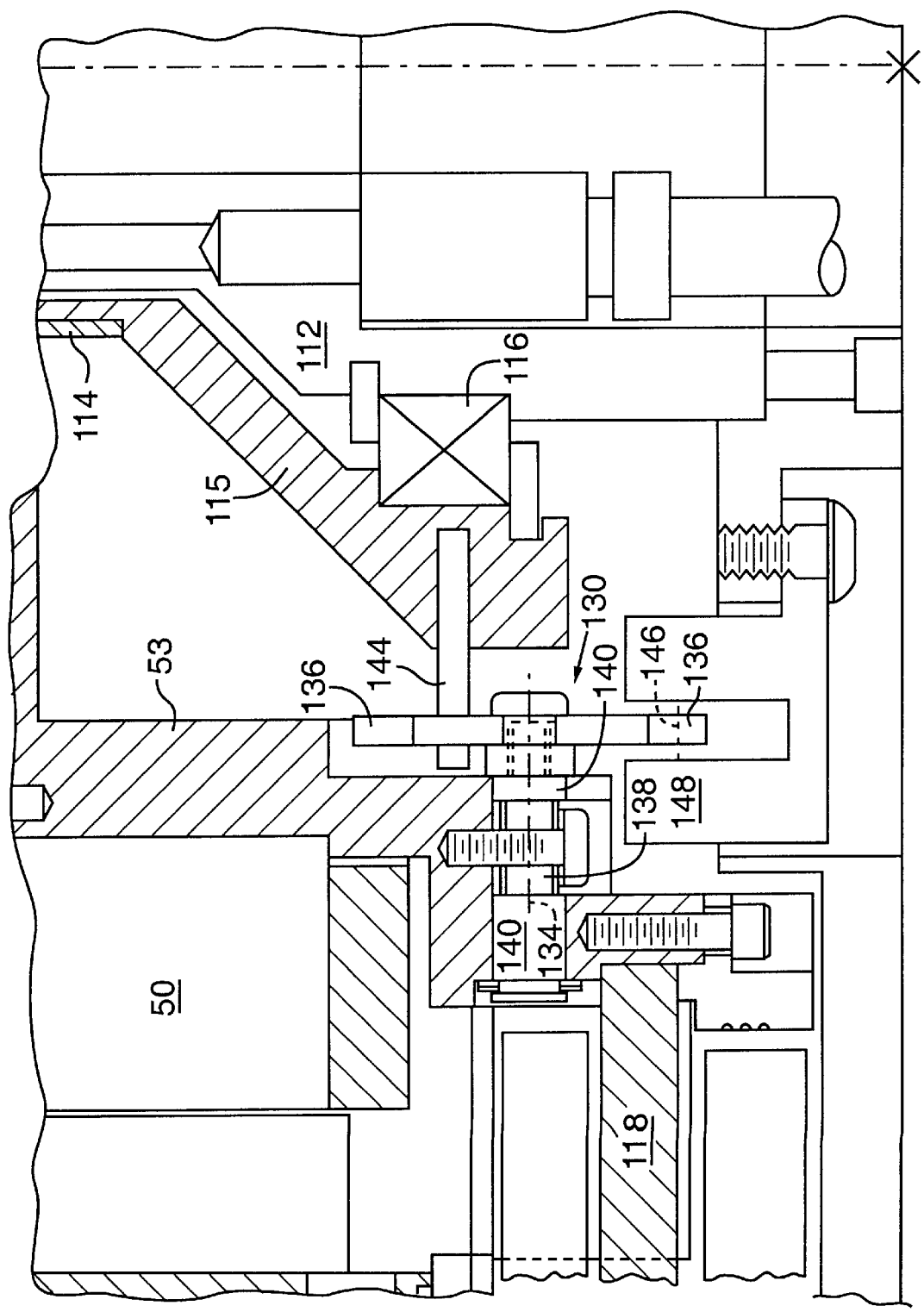
FIG. 6A is a fragmentary elevation view of a lower left portion of FIG. 4 enlarged to reveal an indexing vane and optical sensor of this invention.
Figure 6B:
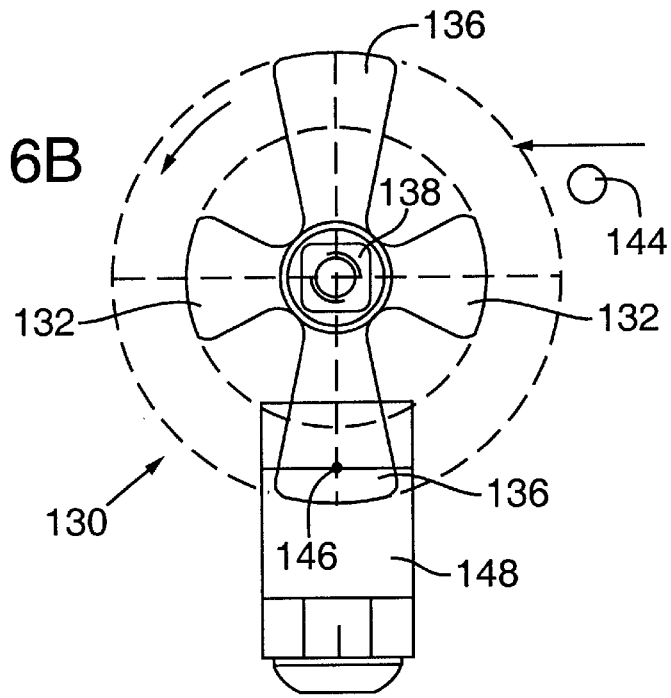
FIGS. 6B and 6C are respective enlarged front and top views revealing further details of the indexing vane of FIG. 6A.
Figure 6C:
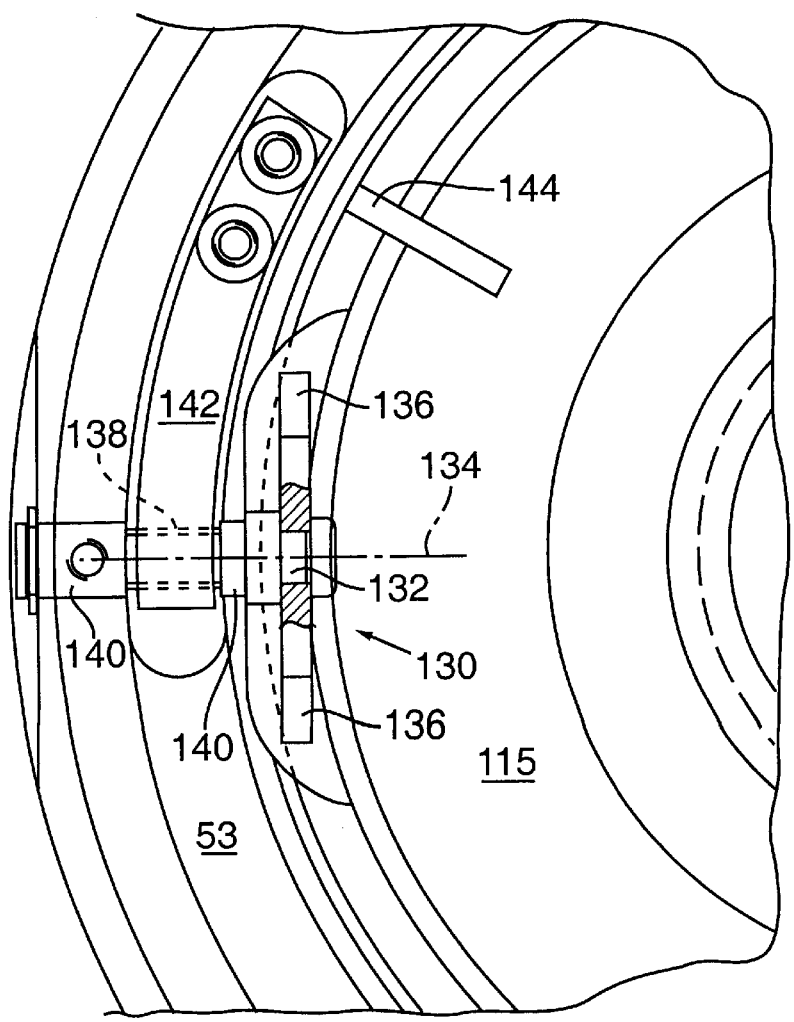

FIGS. 6A, 6B, and 6C show an indexing vane 130 of this invention that provides a solution to the above-described directional control ambiguity. Indexing vane 130 is a Maltese cross-shaped rotational state storage device having two short blades 132 extending in opposite directions transverse to a rotational axis 134, and two long blades 136 also extending in opposite directions transverse to rotational axis 134 but arranged in quadrature to short blades 132.

Indexing vane 130 is mounted to a cross-sectionally square shaft 138 that rotates in bearings 140, which are mounted in forearm spindle 53. A leaf spring 142 pressing against one of four flat surfaces on cross-sectionally square shaft 138 defines four quadrant rest positions for indexing vane 130.

An indexing pin 144 extending from skirt 115, which is rotationally coupled to upper arm 14, is positioned to contact each of the four blades, with a blade being contacted for each 360 degree rotation in either direction of upper arm 14 relative to forearm spindle 53. Only long blades 136 are sufficiently long to break a light beam 146 in an optical switch assembly 148, which is preferably a type No. H0A0870-L51, manufactured by Honeywell Corporation of Minneapolis, Minn. Therefore, for each 720 degree rotation of upper arm 14 relative to forearm spindle 53, indexing vane 130 rotates 180 degrees, causing one of long blades 136 to rotate into a rest position that breaks light beam 146. If forearm spindle 53 rotates and upper arm 14 is stationary, or if forearm spindle 53 is stationary and upper arm 14 rotates, the same effect is achieved. If forearm spindle 53 and upper arm 14 rotate together, indexing vane 130 remains in its current rest position.

Because optical switch assembly 148 is mounted to base housing 12, and indexing vane 130 is mounted to forearm spindle 53, sensing the rotational state of indexing vane 130 requires placing robot arm mechanism 10 in a "reference" position at which indexing vane 130 is axially aligned with optical switch assembly 148. This is accomplished by rotating forearm spindle 53 to a known rotation angle relative to upper arm 14 at which wrist axis 32 overlays shoulder axis 16, and at which hand 30 is either halfway retracted or halfway extended. The known rotational angle is determined by sensing glass scale encoders 118 and 120. Then forearm spindle 53 and upper arm 14 are equally rotated in the second operational state to reach the reference position. If one of long blades 136 breaks light beam 146, robot arm mechanism 10 is in a "home" position at which a predetermined rotational sense of forearm spindle 53 relative to upper arm 14 will extend hand 30 in a predetermined pointing direction. Skilled workers will recognize that opposite predetermined rotational senses, pointing directions, and hand retraction may be employed to implement this invention.

Figure 8:
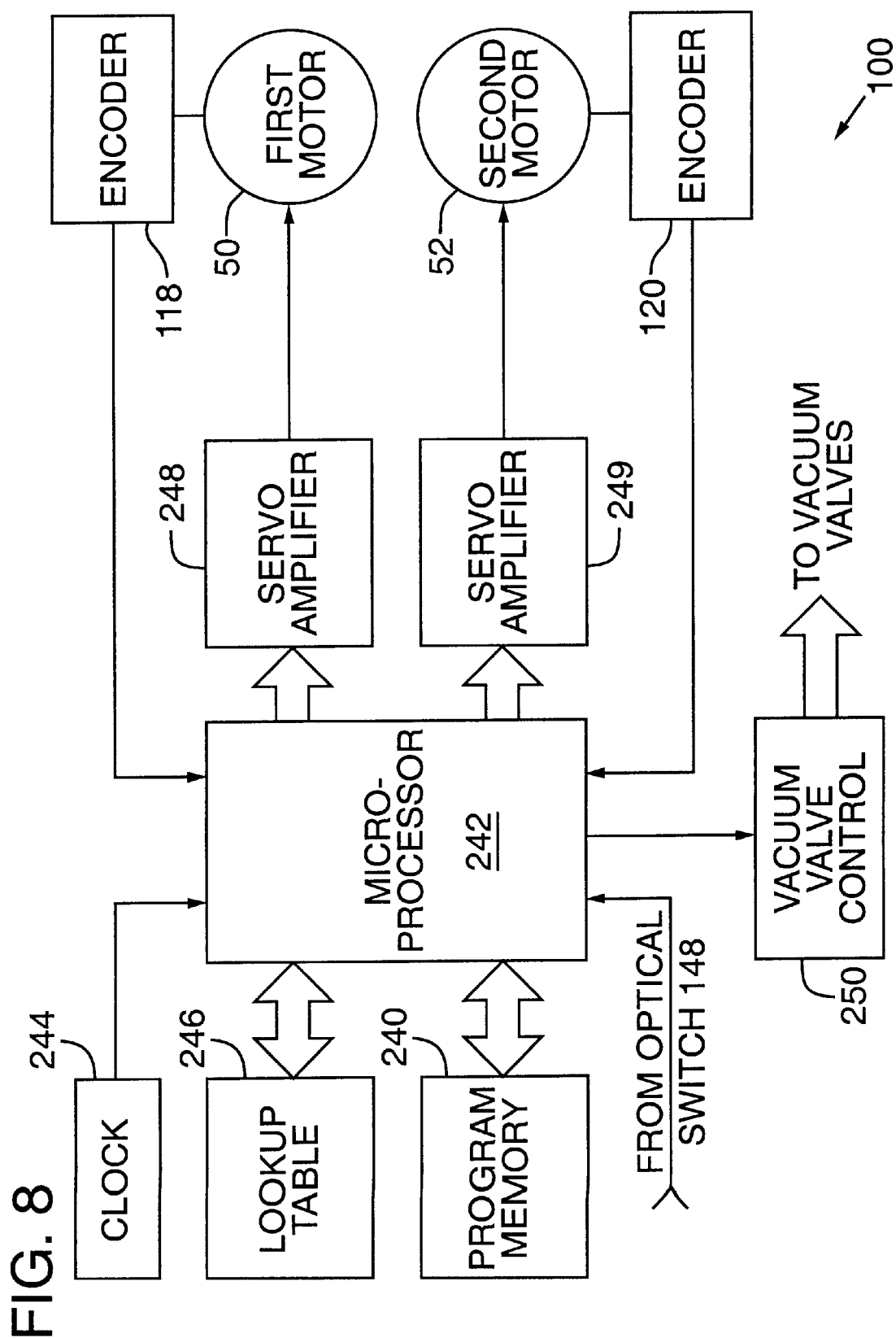
FIG. 8 is an electrical block diagram of a motor controller for driving the motors of the robot arm system of FIGS. 1A and 1B.

Indexing vane 130 is particularly useful because it stores and updates the rotational state of robot arm mechanism 10 even if the power is off and robot arm mechanism 10 is manually repositioned or otherwise disturbed. The rotational state is used to unambiguously determine from glass scale encoders 118 and 120 which of the two rotations (odd or even) first motor 50 is on relative to second motor 52. Indexing vane 130 acts as a modulo two up/down counter that effectively doubles the angular encoding range of glass scale encoders 118 and 120 to unambiguously determine whether hand 30 is extending or retracting and in which pointing direction. Accordingly, the rotational state is always known when robot arm mechanism 10 is powered up and indexing vane 130 is sensed at the home position. Optical switch assembly 148 electrically communicates the sensed rotational state to motor controller 100 (FIG. 8).

Referring again to FIGS. 4 and 5, base housing 12 includes at least one, but preferably two, fluid pressure conduits 150A and 150B enclosed in part within spine 112. Each fluid pressure conduit further includes multiple path segments, with conduit 150A coupling inlet 38 to fluid pressure outlet 36 of hand 30 and conduit 150B coupling inlet 38 to another outlet of a double-ended hand (not shown). Although only single-ended hand 30 is shown, the description is generally applicable to providing fluid pressure to double-ended hands as well. Path segments 152A and 152B of the respective conduits 150A and 150B are flexible hoses leading to vacuum control valves that connect to inlet 38 and are described with reference to FIG. 8. Path segments 154A and 154B in upper arm 14, and related path segments (not shown) in forearm 22, and hand 30 are combinations of channels formed by complementary depressions in mating components, holes passing through solid components, or flexible hoses.

Each path segment of conduits 150A and 150B terminating or originating at shoulder axis 16, elbow axis 24, and wrist axis 32 includes a prior art rotary multiple fluid-passageway spool 200 that functions as two independent vacuum feed-through conduits that permit continuous rotation about any one of the axes. The placement of spool 200 fitted in two of the rotary joints of robot arm mechanism 10 is shown in FIGS. 4 and 5.

Figure 7B:
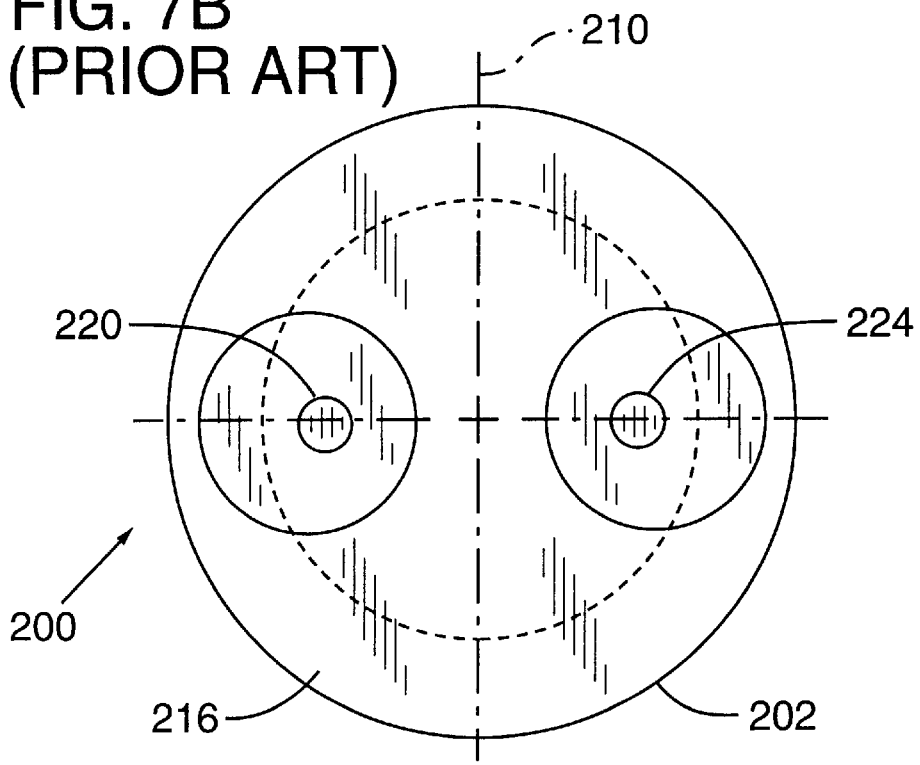
FIGS. 7A and 7B are respective enlarged side elevation and plan views of a prior art rotary multiple fluid-passageway spool installed in each rotary joint of the robot arm system of FIGS. 1A and 1B.
Figure 7A:
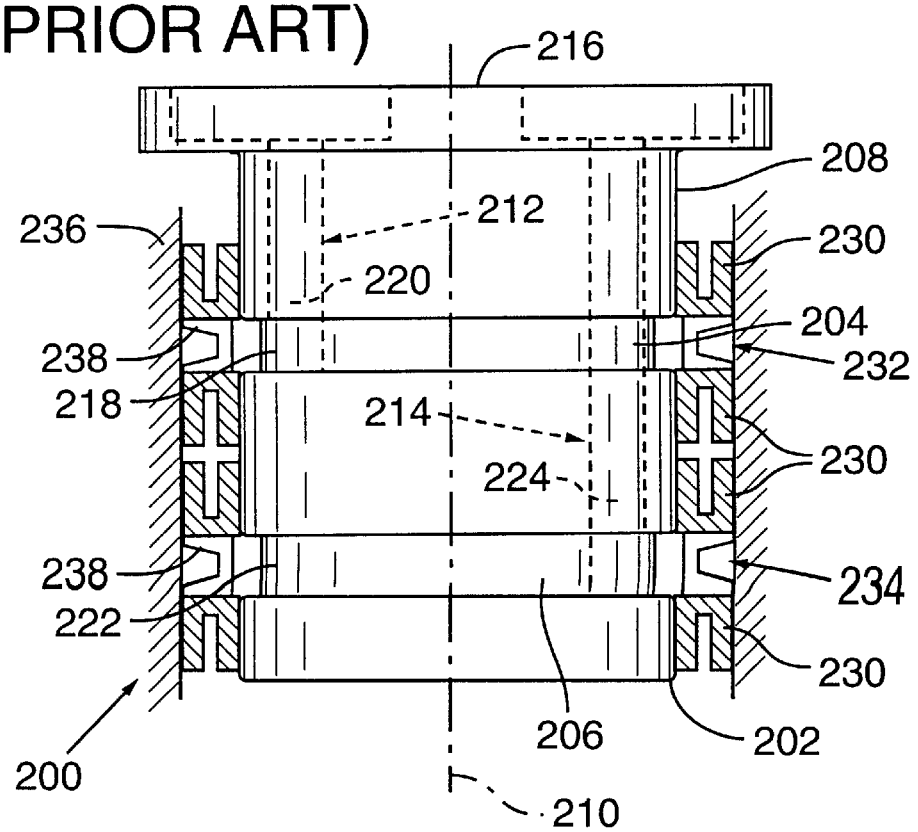

FIGS. 7A and 7B show the design details of rotary multiple fluid-passageway spool 200, which comprises a solid metal cylindrical body 202 having two spaced-apart grooves 204 and 206 formed in and encircling its outer side surface 208 about a longitudinal axis 210. Two separate vacuum pressure delivery channels 212 and 214 are formed within and pass through body 202. Each of channels 212 and 214 has two passageway segments, one originating in a groove and the other terminating at a top surface 216 of body 202. More specifically, for channel 212, a passageway segment 218 extends inwardly from groove 204 in a direction transverse to longitudinal axis 210 and intersects with a passageway segment 220 at a right angle juncture. Passageway segment 220 extends upwardly toward and through top surface 216 in a direction parallel to longitudinal axis 210. Similarly, for channel 214, a passageway segment 222 extends inwardly from groove 206 in a direction transverse to longitudinal axis 210 and intersects with a passageway segment 224 at a right angle juncture. Passageway segment 224 extends upwardly toward and through top surface 216 in a direction parallel to longitudinal axis 210.

For purposes of convenience only, the following describes the operation of spool 200 in the rotary joint defining elbow axis 24. When spool 200 is fitted into post 84 of upper arm 14, four seal rings 230 spaced above, between (two seals), and below grooves 204 and 206 form two annular gas spaces 232 and 234 between side surface 208 of spool 200 and an interior surface 236 of upper arm 14. Spacers 238 that extend about 330 degrees around spool 200 in grooves 204 and 206 maintain the desired separation between adjacent seal rings 230. Path segments 154A and 154B terminate in the respective gas spaces 232 and 234 and their corresponding holes in top surface 216 of spool 200, thereby coupling the fluid pressure supply through spool 200 to forearm 22, and likewise, through another spool 200 surrounding wrist axis 32 to fluid pressure outlets 36 in hand 30.

FIG. 8 shows the primary components of motor controller 100, which includes a program memory 240 that stores control logic, path planning, and move sequence instructions for robot arm system 8. A microprocessor 242 receives rotational state data from optical switch assembly 148 and receives from program memory 240 the move sequence instructions and interprets them together with the operational state data to determine whether the first or second operational state is required for positioning robot arm mechanism 10 and in which direction(s) to rotate first and second motors 50 and 52. A system clock 244 controls the operation of microprocessor 242. A look-up table (LUT) 246 stores corresponding rotational values for first and second motors 50 and 52 to accomplish the straight line motion of the first operational state and the angular displacements to accomplish the angular motion of the second operational state.

Microprocessor 242 provides rotational positioning signals to first and second servo amplifiers 248 and 249, which delivers corresponding command signals to first and second motors 50 and 52. Microprocessor 242 receives from glass scale encoders 118 and 120 signals indicative of the angular positions of the respective motors 50 and 52.

Microprocessor 242 also provides control signals to a vacuum valve controller 250, which causes vacuum valves (not shown) to provide from inlet 38 (FIG. 1A) an appropriate amount of vacuum pressure to vacuum pressure conduits 150A and 150B (FIG. 4) in response to the need to hold or release a wafer from hand 30.

EXAMPLES

FIGS. 9A to 9E show a retraction and extension sequence example for hand 30 of robot arm mechanism 10 and its effect on the rotational state indicated by indexing vane 130 of this invention. In these examples, the rotational state stored by indexing vane 130 is indicated as a logic "0" or a logic "1" state. The logic-0 state occurs when the long blades of indexing vane 130 are oriented to not break the light beam of optical switch assembly 148, and the logic-1 state occurs when the long blades of indexing vane 130 are oriented to break the light beam of optical switch assembly 148.

FIG. 9A shows hand 30 of robot arm mechanism 10 fully extended and pointing in a +X direction. Indexing vane 130 is in a logic-1 state, which is sensed by the proximity of optical switch assembly 148. Indexing pin 144 is separated about 45 degrees clockwise ("CW") from indexing vane 130.

FIG. 9B shows robot arm mechanism 10 operating in the first operational state of motor controller 100 to partially retract hand 30 in the −X direction. Upper arm 14 rotates 90 degrees CW and forearm spindle 53 contrarotates 90 degrees counter-clockwise ("CCW"). Forearm 22 rotates 90 degrees CCW in response to the rotation of forearm spindle 53. Hand 30 undergoes a net 0 degree rotation because the 180 contrarotation between upper arm 14 and forearm 22 causes a 90 degree CW rotation of hand 30 relative to forearm 22, which cancels the 90 degree CCW rotation of forearm 22. Indexing vane 130, still in a logic-1 state, rotates 90 degrees CCW with forearm spindle.

FIG. 9C shows robot arm mechanism 10 still operating in the first operational state of motor controller 100 to completely retract hand 30 in the −X direction. Upper arm 14 rotates 90 degrees CW and forearm spindle 53 contrarotates 90 degrees CCW. During this 180 degree contrarotation, indexing vane 130 toggles to a logic-0 state as it passes indexing pin 144. However, the logic-0 state is not communicated to motor controller 100 because indexing vane 130 and optical switch assembly 148 are not aligned. Forearm 22 rotates 90 degrees CCW in response to the rotation of forearm spindle 53, and hand 30 undergoes a net 0 degree rotation for the reasons stated with reference to FIG. 9B.

At this point in the sequence, if robot arm mechanism 10 were to rotate 180 degrees CW or CCW in the second operational state of motor controller 100, upper arm 14 and forearm 22 would be positioned as shown in FIG. 9A, but hand 30 would be pointing in the −X direction and indexing vane 130 would communicate a logic-0 state to optical switch assembly 148.

FIG. 9D shows robot arm mechanism 10 still operating in the first operational state of motor controller 100 to partially extend hand 30 in the +X direction. Upper arm 14 rotates 90 degrees CW and forearm spindle 53 contrarotates 90 degrees CCW. During this 180 degree contrarotation, indexing vane 130 retains the logic-0 state. Forearm 22 rotates 90 degrees CCW in response to the rotation of forearm spindle 53, and hand 30 undergoes a net 0 degree rotation for the reasons stated with reference to FIG. 9B.

FIG. 9E shows robot arm mechanism 10 still operating in the first operational state of motor controller 100 to completely extend hand 30 in the +X direction as also shown in FIG. 9A. Upper arm 14 rotates 90 degrees CW and forearm spindle 53 contrarotates 90 degrees CCW. During this 180 degree contrarotation, indexing vane 130 toggles back to a logic-1 state as it passes indexing pin 144. The logic-1 state is communicated to motor controller 100 because indexing vane 130 and optical switch assembly 148 are aligned. As before, forearm 22 rotates 90 degrees CCW in response to the rotation of forearm spindle 53, and hand 30 undergoes a net 0 degree rotation for the reasons stated with reference to FIG. 9B.

During the sequence shown in FIGS. 9A to 9C, upper arm 14 and forearm spindle 53 contrarotated 360 degrees, causing indexing vane 130 to change states, but not communicate the state change. During the sequence shown in FIGS. 9C to 9E, upper arm 14 and forearm spindle 53 contrarotated another 360 degrees, causing indexing vane 130 to change states again, and communicate no net state change.

FIGS. 10A to 10E show a pointing direction reversal sequence example for hand 30 of robot arm mechanism 10 and its effect on the rotational state indicated by indexing vane 130 of this invention. In this example, upper arm 14 and indexing pin 144 do not rotate. All motion is caused by rotation of upper arm spindle 53. Of course, the same relative motion could be effected by holding forearm spindle 53 stationary and rotating upper arm 14.

Figure 10A:
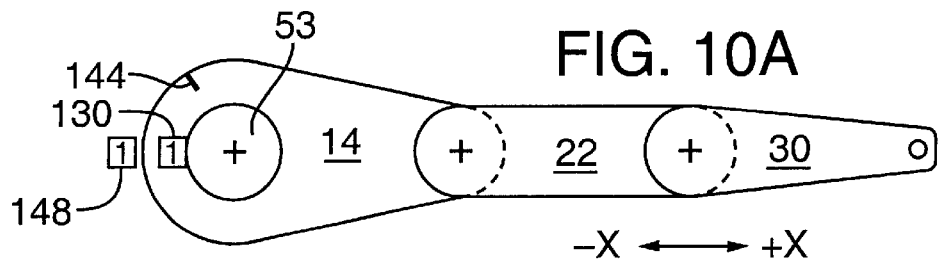
FIGS. 10A to 10E are five simplified plan views showing a robot arm pointing direction reversal sequence and its effect on the indexing vane of this invention.

FIG. 10A shows hand 30 of robot arm mechanism 10 fully extended and pointing in a +X direction. Indexing vane 130 is in a logic-1 state, which is sensed by the proximity of optical switch assembly 148. Indexing pin 144 is separated about 45 degrees clockwise ("CW") from indexing vane 130. This is the same starting position as shown in FIG. 9A.

Figure 10B:
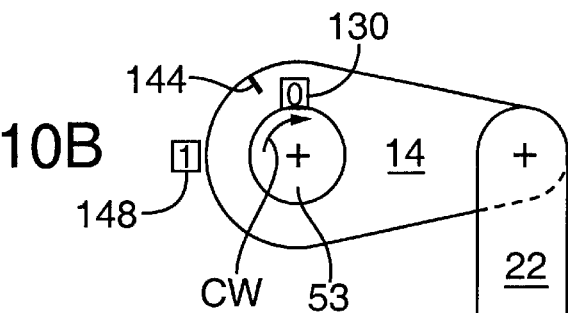

FIG. 10B shows robot arm mechanism 10 holding upper arm 14 stationary and rotating forearm spindle 53 CW 90 degrees. Forearm 22 rotates 90 degrees CW in response to the rotation of forearm spindle 53. Hand 30 undergoes a net 45 degree CW rotation because of the 90 degree CW rotation of forearm 22 relative to upper arm 14. During this 90 degree rotation, indexing vane 130 toggles to a logic-0 state as it passes indexing pin 144. However, the logic-0 state is not communicated to motor controller 100 because indexing vane 130 and optical switch assembly 148 are not aligned.

Figure 10C:
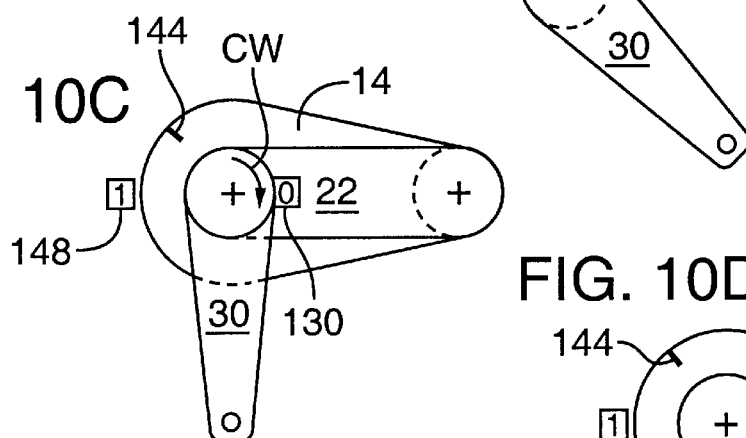

FIG. 10C shows robot arm mechanism 10 still holding upper arm 14 stationary and rotating forearm spindle 53 another 90 degrees CW. Forearm 22 rotates 90 degrees CW in response to the rotation of forearm spindle 53. Hand 30 undergoes another net 45 degree CW rotation because of the 90 degree CW rotation of forearm 22 relative to upper arm 14. During this 90 degree rotation, indexing vane 130 does not pass indexing pin 144.

Figure 10D:
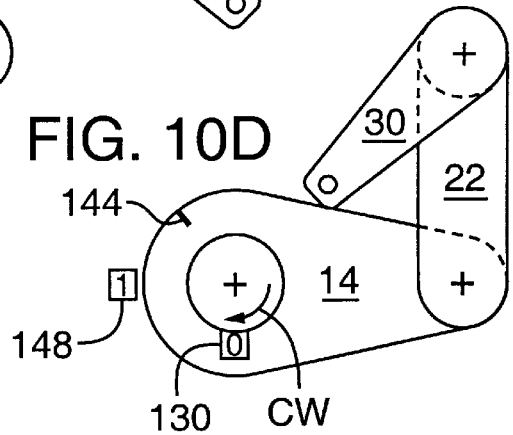

FIG. 10D shows robot arm mechanism 10 still holding upper arm 14 stationary and rotating forearm spindle 53 another 90 degrees CW. Forearm 22 rotates 90 degrees CW in response to the rotation of forearm spindle 53. Hand 30 undergoes another net 45 degree CW rotation because of the 90 degree CW rotation of forearm 22 relative to upper arm 14. During this 90 degree rotation, indexing vane 130 does not pass indexing pin 144.

Figure 10E:
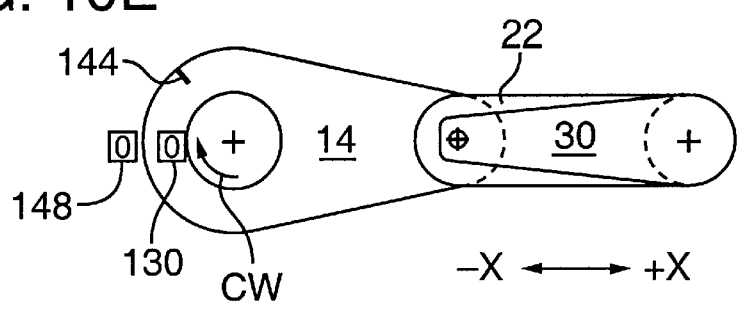

FIG. 10E shows robot arm mechanism 10 still holding upper arm 14 stationary and rotating forearm spindle 53 another 90 degrees CW. Forearm 22 rotates 90 degrees CW in response to the rotation of forearm spindle 53. Hand 30 undergoes another net 45 degree CW rotation and now points in the −X direction.

During this 90 degree rotation, indexing vane 130 does not pass indexing pin 144, but has rotated 360 degrees back into alignment with and, thereby, communicating the logic-0 state to optical switch assembly 148.

During the sequence shown in FIGS. 10A to 10E, forearm spindle 53 rotated 360 degrees relative to upper arm 14, causing indexing vane 130 to change states from the logic-1 state to the logic-0 state, indicating the reversal in the pointing direction of hand 30.

Skilled workers will recognize that portions of this invention may be implemented differently from the implementations described above for a preferred embodiment. For example, the indexing vane is usable in robot arms having more than three links. The leaf spring and square shaft for detenting the indexing vane to one of four rest positions may be replaced by other detenting means, such as a spring and ball detent, or a magnetic reluctance path detent. Likewise the optical state sensor may be replaced by a nonoptical sensor employing capacitive, electret, magnetic, reluctance path, hall effect, or other forms of sensing. In general, the indexing vane function may be replaced by many forms of a generic modulo two counter with nonvolatile storage.

Moreover, this invention is not limited to robot arm mechanisms having a 1:1:1:2 overall drive ratio, and the indexing vane is not necessary to operation. Indeed, some applications may increase operational torque by choosing a less than 2:1:1:2 drive ratio while others may increase operational speed by choosing a greater than 2:1:1:2 drive ratio. In both cases the key requirement for linear extension of hand 30 is synchronous countrarotation or rotation of first and second motors 50 and 52 at a rotational speed ratio consistent with the selected overall drive ratio.

It will be obvious to those having skill in the art that many changes may be made to the details of the above-described embodiments of this invention without departing from the underlying principles thereof. The scope of this invention should, therefore, be determined only by the following claims.

We claim:

1. A multiple link robot arm apparatus, comprising:
   an upper arm supporting a forearm and a hand and operable for rotation about a shoulder axis, the forearm having a first end that is supported by the upper arm for rotation about an elbow axis and having a second end that supports the hand for rotation about a wrist axis;
   a first motor coupled to the forearm with an X:1 drive ratio for rotatably positioning the forearm about the elbow axis, wherein X is other than 2;
   a second motor coupled to the upper arm with a 1:1 drive ratio for rotatably positioning the upper arm about the shoulder axis;
   a mechanical linkage operatively connecting the upper arm and the forearm, the mechanical linkage forming an active drive link between the first motor and the forearm to cause the forearm to rotate about the elbow axis in response to operation of the first motor and a passive drive link between the forearm and the hand to cause the hand to rotate about the wrist axis in response to rotation of the forearm about the elbow axis; and
   a controller coordinating the operation of the first and second motors in at least a first state characterized by contrarotating the first and second motors so that the mechanical linkage causes linear displacement of the hand radial to the shoulder axis.

2. The apparatus of claim 1 in which the controller further coordinates the operation of the first and second motors in at least a second state characterized by rotating the first and second motors in the same direction and at equal rotational velocities so that the mechanical linkage causes angular displacement of the hand about the shoulder axis.

3. The apparatus of claim 1 in which X=1 and the first and second motors contrarotate at equal angular velocities.

4. The apparatus of claim 1 in which the hand moves at a linear displacement rate that increases as X increases.

5. The apparatus of claim 4 in which X is greater than 2.

6. The apparatus of claim 1 in which the hand moves at with a linear displacement force that increases as X decreases.

7. The apparatus of claim 6 in which X is less than 2.

8. The apparatus of claim 1 in which the hand is further operable for pointing in a predetermined pointing direction in response to a rotational state of the first motor relative to the second motor, the apparatus further including:
   an indexing vane coupled to the first motor for determining and storing the rotational state;
   an indexing pin coupled to the second motor for changing the rotational state stored by the indexing vane when the indexing pin passes in proximity to the indexing vane; and
   a sensor sensing the rotational state stored by the indexing vane and generating a rotational state signal that is received by the controller for controlling rotation of the first and second motors to move the hand in the predetermined pointing direction.

9. The apparatus of claim 8 in which the sensor is mounted on a stationary member and senses the rotational state stored by the indexing vane when the indexing vane is in proximity to the sensor.

10. The apparatus of claim 8 in which the robot arm includes powered and unpowered states and the indexing vane is capable of updating and storing the rotational state in the powered and unpowered states.

11. The apparatus of claim 8 in which the indexing vane is a Maltese cross-shaped device including a pair of opposed short blades positioned in quadrature to a pair of opposed long blades.

12. The apparatus of claim 11 in which the indexing vane is attached to a shaft that is detented to rotate to four rest positions.

13. The apparatus of claim 12 in which the indexing pin rotates the indexing vane to an adjacent one of the rest positions when the indexing pin contacts any of the short or long blades.

14. The apparatus of claim 13 in which the sensor is an optical switch assembly that generates the rotational state signal in response to a long blade of the indexing vane breaking a light beam.

15. The apparatus of claim 8 in which the indexing pin changes the rotational state stored by the indexing vane once for each 360 degree rotation of the first motor relative to the second motor.

16. In a multiple link robot arm including an upper arm supporting a forearm and a hand and operable for rotation about a shoulder axis, the forearm having a first end that is supported by the upper arm for rotation about an elbow axis and having a second end that supports the hand for rotation about a wrist axis, a method of controlling the robot arm, comprising:

coupling a first motor to the forearm with an X:1 drive ratio for rotatably positioning the forearm about the elbow axis, wherein X is other than 2;

coupling a second motor to the upper arm with a 1:1 drive ratio for rotatably positioning the upper arm about the shoulder axis;

connecting the upper arm to the forearm with a mechanical linkage that forms an active drive link between the first motor and the forearm to cause the forearm to rotate about the elbow axis in response to operation of the first motor and a passive drive link between the forearm and the hand to cause the hand to rotate about the wrist axis in response to rotation of the forearm about the elbow axis; and coordinating the operation of the first and second motors in at least a first state characterized by contrarotating the first and second motors so that the mechanical linkage causes linear displacement of the hand radial to the shoulder axis.

17. The method of claim 16 further including the operation of the first and second motors in at least a second state characterized by rotating the first and second motors in the same direction and at equal rotational velocities so that the mechanical linkage causes angular displacement of the hand about the shoulder axis.

18. The method of claim 16 in which X=1 and the first and second motors contrarotate at equal angular velocities.

19. The method of claim 16 in which X is greater than 2, and the hand moves at a linear displacement rate that increases as X increases.

20. The method of claim 16 in which X is less than 2, and the hand moves at with a linear displacement force that increases as X decreases.

* * * * *